United States Patent [19]

Landua et al.

[11] Patent Number: 5,425,441
[45] Date of Patent: Jun. 20, 1995

[54] WORKPIECE TRANSPORTING APPARATUS

[75] Inventors: Werner Landua, Mannheim; Reiner Rommel, Brühl; Jürgen Müller, Mannheim, all of Germany

[73] Assignee: Adolf Hottinger Maschinenbau GmbH, Mannheim-Rheinau, Germany

[21] Appl. No.: 94,110
[22] PCT Filed: Dec. 21, 1991
[86] PCT No.: PCT/DE91/01012
§ 371 Date: Jul. 29, 1993
§ 102(e) Date: Jul. 29, 1993
[87] PCT Pub. No.: WO92/12916
PCT Pub. Date: Aug. 6, 1992

[30] Foreign Application Priority Data

Jan. 29, 1991 [DE] Germany ............ 41 02 568.7

[51] Int. Cl.⁶ .............................................. B65G 47/24
[52] U.S. Cl. .................. 198/377; 198/803.7; 198/803.12
[58] Field of Search ............ 198/377, 470.1, 803.7, 198/803.12, 378, 474.1

[56] References Cited

U.S. PATENT DOCUMENTS

| | | | |
|---|---|---|---|
| 2,224,975 | 12/1970 | McNamara | 198/377 |
| 2,813,505 | 11/1957 | Eirinberg | 198/377 |
| 3,390,757 | 7/1968 | Edwards et al. | 198/803.12 |
| 3,945,486 | 3/1976 | Cooper | 198/803.12 |
| 4,783,905 | 11/1988 | Hasenkamp | 198/378 |
| 4,798,276 | 1/1989 | Loeffler | 198/378 |
| 5,156,255 | 10/1992 | Landua et al. | 198/470.1 |

FOREIGN PATENT DOCUMENTS

| | | |
|---|---|---|
| 2211850 | 9/1973 | Germany . |
| 3142279 | 6/1982 | Germany . |
| 3138954 | 7/1982 | Germany . |
| 3336068 | 4/1985 | Germany . |
| 3545675 | 6/1987 | Germany . |
| 3624554 | 1/1988 | Germany . |

Primary Examiner—Joseph E. Valenza
Attorney, Agent, or Firm—Bell, Seltzer, Park & Gibson

[57] ABSTRACT

A transporting device, preferably for transporting workpieces (1) between processing stations, the device comprising an upright (2) and at least one holding device carried by upright (2) for receiving workpiece (1), the holding device (3) having again at least one holding element (4) adapted for engagement with the workpiece (1), is designed and constructed to obtain a faster timing sequence with smallest possible floor space requirements, in particular within the scope of treating foundry cores and molds, in such a manner that the holding device (3) is continuously rotatable about a vertical axis (5), so that the holding element (4) describes a substantially circular path.

9 Claims, 2 Drawing Sheets

WORKPIECE TRANSPORTING APPARATUS

BACKGROUND OF THE INVENTION

The invention relates to a transporting device, preferably for transporting workpieces between processing stations, in particular for treating foundry cores and molds, the device comprising an upright and at least one holding device carried by the upright for receiving the workpiece, the holding device being again provided with at least one holding element adapted for engagement with the workpiece.

Transporting devices of the kind in question have been known from practice for years. To demonstrate the problems having so far been attached to these transport devices, the description as it proceeds will refer to the foundry practice, without however limiting thereto the teaching of the present invention.

In the foundry practice, in particular for casting molded pieces, cores or molds are generally manufactured separately, combined, and interconnected. Thereafter, the interconnected cores are individually transported to a blacking device, in that the cores are moved in a downward hanging position into a dipping station. To this end, the cores are generally flooded by raising a tank filled with blacking. Finally, it is necessary to allow excessive blacking to drip from the cores, the latter being delivered at a transfer station to a further transporting device, for example for drying in drying furnaces.

In practice however, the transporting devices for transporting foundry cores to the respective processing stations are problematic, inasmuch as these transporting devices allow only a certain controlled speed on the one hand, and require considerable amount of floor space on the other hand as a result of the generally linear arrangement of the processing stations.

It is therefore the object of the present invention to configure and further develop the initially-described transporting device such that this device allows to realize a fast timing sequence with little floor space requirements. This transporting device is to be particularly suitable for the treatment of foundry cores and molds.

SUMMARY OF THE INVENTION

The transporting device of the present invention accomplishes the foregoing object. Accordingly, the initially-described transporting device is configured and further developed such that the holding device is continuously rotatable about a vertical axis, so that the holding element describes a substantially circular path.

In accordance with the invention, it has primarily been recognized that it is necessary to arrange the processing stations in a circle to shorten the paths of transportation on the one hand, and to reduce the floor space requirements on the other. Accordingly, the holding device is adapted for continuous rotation about a vertical axis, so that the holding element describes a substantially circular path, along which the individual processing stations, for example, the blacking device and the dripping zone are arranged.

In an especially advantageous manner, the holding device serving to hold the workpiece is also adapted for rotation about a horizontal axis. Such a rotation can be realized preferably in a range up to 180°. Likewise, it would be conceivable to design and construct the holding device for an endless horizontal rotation or pivoting by 360°, thereby making it unnecessary to rotate or pivot the holding device back.

Assuming that the workpiece to be processed is placed from outside the transporting device onto the holding device and secured thereon, it is possible to pivot the workpiece downward via the horizontal rotating means. Accordingly, the holding element can be rotated in any horizontal position of the holding device from an upward directed position to a downward directed position.

To be able to process or transport several workpieces at the same time, at least two holding devices are provided in a further advantageous manner, the holding devices being arranged oppositely to one another at equal distances from the vertical axis of rotation. Naturally, it is possible to arrange several axes of rotation in star shape around the vertical axis of rotation, it being necessary that the holding devices be equally spaced apart from one another already for static reasons.

Since each individual holding element associated with the holding device will not suffice to securely hold a workpiece, each holding device is advantageously provided with at least two, preferably more holding elements. The configuration of these holding elements is described below in more detail.

The rotational movement extending about a vertical axis and/or the pivotal movement of the holding device extending about a horizontal axis may be effected respectively by means of an electric drive motor. To this end, for example, servomotors may be used. In a particularly advantageous manner, however, the rotational movement and/or the pivotal movement of the holding device may be effected also by a hydraulic or pneumatic drive. Accordingly, it would then be possible to correct on the one hand the holding device with respect to its rotation about a vertical axis and on the other hand the holding elements with respect to their pivotal movement about a horizontal axis by means of a rotating distributor for the pressure medium directly or indirectly to the upright of the transporting device. Such a rotating distributor which is known per se from the prior art, allows to deliver the pressure medium free of losses to the respective operating positions.

The holding elements themselves which serve to hold the workpiece, could be designed likewise for hydraulic or pneumatic actuation. The supply of the holding elements with a pressure medium occurs then likewise via rotating distributors known per se. In a particularly advantageous manner, the holding elements may be controlled via a control means which operates preferably as a function of the rotated position. In other words, the holding elements are activated or deactivated as a function of the horizontal position of the actuation device. The control means used for actuation could in a particularly advantageous manner be designed and constructed as a stationary cam disk. This cam disk could then directly actuate a hydraulic or pneumatic valve for each holding device. Likewise however, the cam shaft or the control means could also rotate jointly with the holding device, it being then necessary to arrange the hydraulic or pneumatic valve accordingly in a stationary position. Both aforesaid arrangements are basically possible.

With respect to the arrangement of the holding elements it is of further advantage, when the holding elements are designed for horizontal adjustment relative to one another along a guideway or control shaft or the like via a spindle associated with the upright of the device. Apart from this linear adjustment, the holding elements could also be adjustable along a guideway or control shaft or the like, the position of the guideway or control shaft being variable orthogonally to its adjustment device, possibly via a further guideway or control shaft. As a whole, the holding elements could then be adjusted relative to one another horizontally in all directions and any desired manner in the meaning of an X-Y coordinate control.

The spindle for adjusting the guideway or control shaft could be actuatable by hand via a hand wheel or the like, especially when having in mind a simple construction. Likewise, it would be possible to operate the spindle also via an NC control by means of a servomotor or the like.

In order to be able to adjust or displace the holding elements by actuating the spindle or the like with simple constructional means, the adjustment occurs quasi automatically via a slot link which is associated with the spindle and can be engaged with an engagement means of the holding element. To reliably adapt the position of the holding element to the workpiece to be transported, this slot link or the spindle carrying the slot link is stationarily associated with the upright of the transporting device at a point, where the workpiece can be engaged with the holding device. Once this engagement is accomplished, the position of the holding elements relative to one another can no longer be changed by force, so that it is no longer necessary to further guide or control the position of the holding elements in the course of the transportation.

As regards a special application of the transporting device in accordance with the invention, the holding elements are designed and constructed as insertable grippers. The term insertable gripper is here to be understood such that the holding elements are inserted into a recess or the like provided in the workpiece to be transported or treated, or that the workpiece is placed accordingly onto the holding device with the holding elements, it being possible to secure the insertable grippers in the recesses. To this end, the insertable gripper has in an especially advantageous manner an elastic wall, preferably conically tapering toward the free end, and its diameter enlarges upon hydraulic or pneumatic actuation of the holding elements. Accordingly, the diameter of the insertable grippers should approximately correspond to the recesses of the workpiece to be transported already prior to their engagement.

The required elasticity of the wall of the insertable gripper is advantageously obtained in that the elastic wall is made of rubber, the pressure medium inside the pressure gripper being able to flow into an expansion chamber which is formed directly or indirectly by the elastic wall. Consequently, as the pressure medium enters, the insertable gripper expands, the outside wall of the gripper contacts the inside wall of the recess in the workpiece to be transported, so that the insertable gripper is secured inside this recess.

To be able to use the transporting device of the present invention not only for transporting within a circular region, the upright itself is in a particularly advantageous manner movable in horizontal direction. Thus, the transporting device of the present invention allows to approach several "technological nests", each of these "technological nests" comprising several circularly arranged processing stations in accordance with the foregoing description. In this arrangement, it would be quite possible to arrange successively and quasi interlink several transporting devices, each comprising an upright and corresponding holding devices.

Finally, it is possible to use the transporting device of the present invention in an especially advantageous manner within the scope of treating foundry cores or molds. In this application, the insertable grippers serve to engage in corresponding recesses in the foundry cores or molds, in particular in bottom-mounted and water-jacketed cores.

BRIEF DESCRIPTION OF THE DRAWINGS

There are various possibilities of advantageously configuring and further developing the teaching of the present invention. To this end, reference is made to the following description of an embodiment of the invention with reference to the drawings. In connection with the description of the preferred embodiment of the invention with reference to the drawings, also generally preferred embodiments and further developments of the teaching are explained. In the drawings.

DETAILED DESCRIPTION OF THE PREFERRED EMBODIMENT

Figure 1:
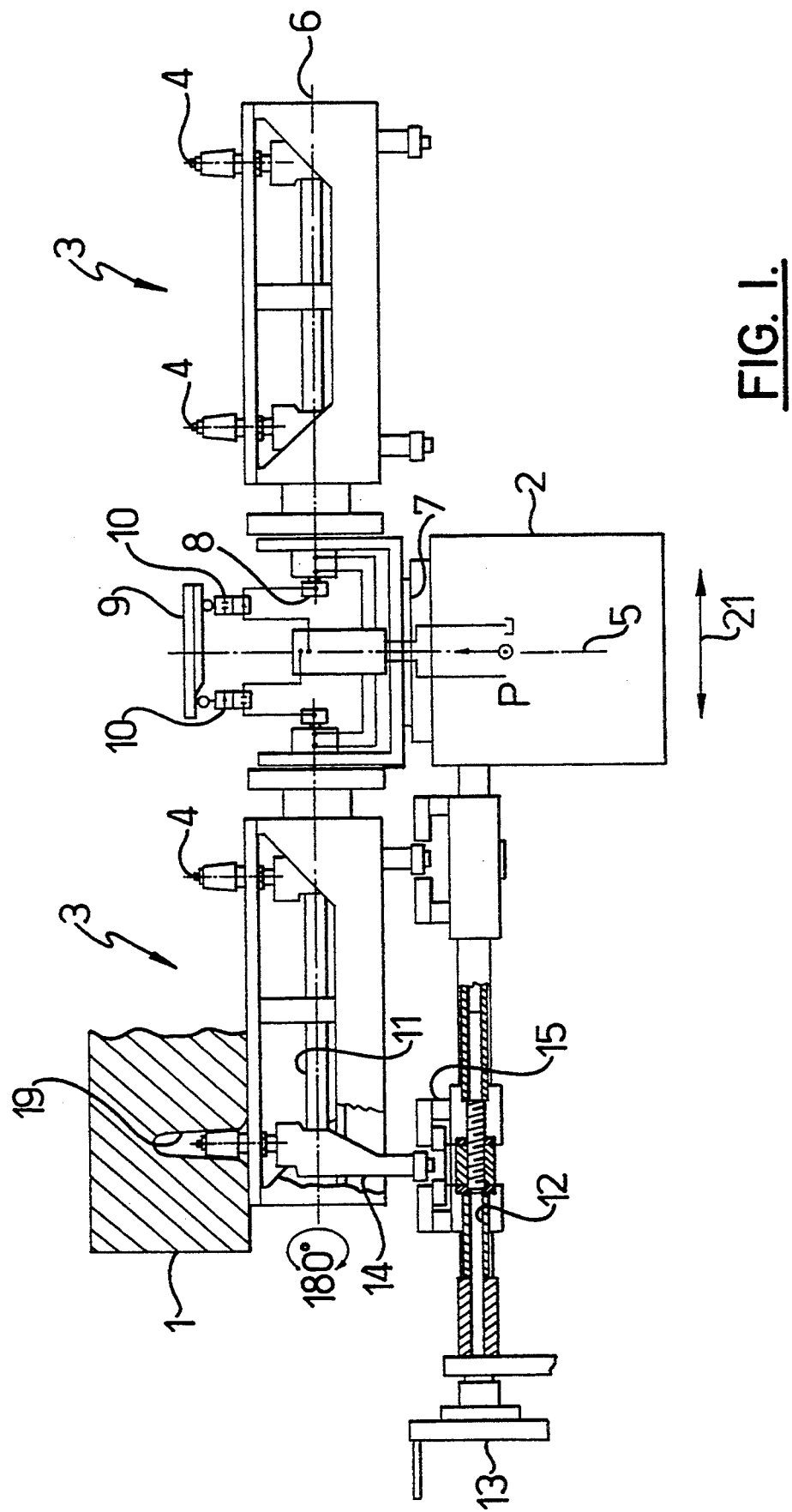
FIG. 1 is a schematic view, partially cut and broken away, of an embodiment of a transporting device in accordance with the invention.

Shown in FIG. 1 is a transporting device for transporting workpieces 1 between processing stations not shown. Within the scope of the here selected embodiment these workpieces are foundry cores. The transporting device comprises an upright 2 and two holding devices 3 carried by upright 2 and receiving workpiece 1. Each of the holding devices 3 again comprises two holding elements 4 as shown in the Figure, which are adapted to engage with workpiece 1, the number of holding elements 4 being variable in accordance with the geometry and size of the workpiece to be transported.

In accordance with the invention, the holding device 3 is continuously rotatable about a vertical axis 5, so that as the holding device 3 rotates, the holding elements 4 describe a substantially circular path.

The holding device 3 is further rotatable by 180° about a horizontal axis 6, so that the holding elements 4 are rotated in any horizontal position of holding device 3 from an upward directed position to a downward directed position. Also, as best seen in FIG. 1, the holding devices 3 are arranged oppositely to one another at about equal distances from vertical axis 5.

The rotation or pivotal movement of holding device 3 occurs respectively by means of a hydraulic drive. To realize this hydraulic drive, the holding device is corrected on the one hand with respect to its rotation about vertical axis 5, and on the other hand with respect to its pivotal movement about horizontal axis 6, respectively by means of a pressure distributor 7, 8 for the pressure medium directly or indirectly to upright 2.

The actuation of the holding elements 4 again occurs pneumatically in the here preferred embodiment. The supply of holding elements 4 with the pressure medium occurs likewise via pressure distributors 7, 8. To activate or deactivate the holding elements 4, a control means 9 is provided, which actuates the holding elements 4 as a function of the rotated position, i.e. as a function of the horizontal position of holding device 3.

In the embodiment shown in FIG. 1, the control means 9 is constructed as a stationary cam disk. The cam disk actuates directly a pneumatic valve 10, the illustration in FIG. 1 being selected such that the valve 10 shown on the left side deactivates the holding elements 4 on the left side, and the valve 10 shown on the right side activates the holding elements 4 arranged on the right side.

FIG. 1 further shows that the holding elements 4 are horizontally adjustable toward each other along a control shaft 11 via a spindle 12 associated with upright 2. An adjustment vertical to the plane of the drawing is possible, but not contained in the Figure. The spindle 12 can be actuated manually via a hand wheel 13. Likewise possible is an actuation via an NC control, for example by means of a servomotor.

Further associated to holding elements 4 are engagement means 14. The latter can be engaged respectively with a slot link 15, so that a displacement or adjustment of holding elements 4 is possible quasi automatically via sloe links 15 associated to and adjustable along spindle 12. Essential is that the slot link 15 or the spindle 12 carrying slot link 15 is associated with upright 2 at a point, where the workpiece 1 is engaged with holding device 3. Precisely there it is only necessary that holding elements 4 be circularly aligned, so that it is possible to place workpiece 1 on holding device 3 without difficulty and without damaging workpiece 1. As the transportation proceeds, the position of holding elements 4 relative to one another can no longer change because of the workpiece 1 inserted thereon. A further slot link control is therefore no longer needed.

FIG. 1 also schematically illustrates by the double arrow 21 that the upright 2 may be mounted for movement along a horizontal direction. This permits the apparatus of the present invention to service a number of circularly arranged processing stations by being moveable therebetween.

Figure 2:
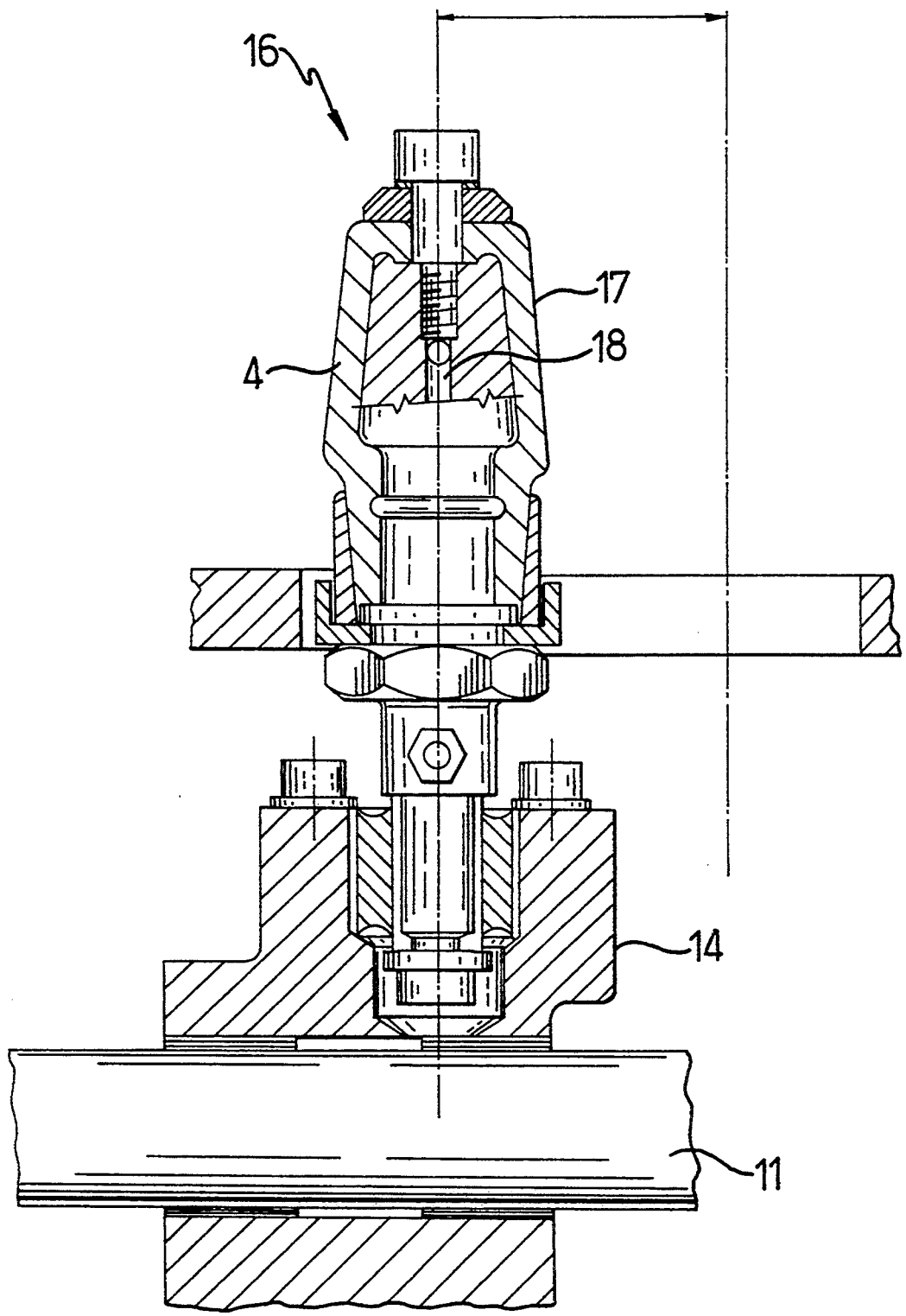
FIG. 2 is an enlarged schematic view of an insertable gripper of the transporting device shown in FIG. 1.

FIG. 2 shows especially clearly that the holding elements 4 are constructed as insertable grippers. Such a holding element or insertable gripper 4 has an elastic wall 17 conically tapering toward its free end 16, the diameter of which is hydraulically enlarged upon actuation. Accordingly, a pressure chamber 18 is formed in the interior of insertable gripper 4.

Subsequently, a brief reference is made to the fact that the holding elements constructed as insertable grippers 4 are used in particularly advantageous manner for engagement in corresponding recesses in foundry cores and molds, in particular in bottom-mounted and water-jacketed cores. For a better understanding of such a particularly advantageous use of the transporting device in accordance with the invention within the scope of treating foundry cores, a possible operating sequence is briefly described in the following:

The interconnected workpieces 1 or cores are transported by a gripping and transporting device not shown in the Figures from a connecting station for connecting individual core components to a "feed station" of a blacking machine likewise not shown, and are there placed on holding device 3 or insertable grippers 4 arranged thereon. Subsequently, the transporting device or the holding devices 3 are rotated by one controlled step. In accordance with the configuration and arrangement of cam disk 9 which serves to control insertable grippers 4, the latter are activated or deactivated. When the insertable grippers 4 are activated, their walls 17 are pressed against the inside walls of recesses 19 of the cores, so that the latter can be pivoted safely downward about horizontal axis 6. In this downward rotated position, the cores can be moved in the dipping station into a blacking bath, for example by raising a tank filled with blacking.

In the course of further legs of the operating cycle, excessive blacking is allowed to drip into a tank likewise not shown. At a "transfer station", cam disk 9 controls the insertable grippers 4 so as to cause an "airless" condition, which permits to move the group of cores located on holding device 3 by a further gripping and transporting device to drying furnaces.

As can be clearly noted from FIG. 1, the positions of insertable grippers 4, as the latter pass through slot link 15, adjust automatically to the position of slot link 15 which has been adjusted via spindle 12.

Finally, it should be emphasized that the gist of the present invention, namely a realization of a faster timing sequence with lesser floor space requirements, can be realized also in other applications or processing stations. The foregoing treatment of foundry cores and molds is described only as an example serving for an understanding of the teaching of the present invention, but is not limited thereto.

We claim:

1. An apparatus for transporting workpieces between processing stations, and comprising a supporting upright, at least one workpiece holding device, means rotatably mounting said one workpiece holding device to said supporting upright for rotation about a vertical axis so as to define a circular path of travel, and for rotation about a horizontal axis, drive means for rotating said one workpiece holding device about said vertical axis and for selectively rotating said workpiece holding device about said horizontal axis at predetermined locations about the circular path of travel, said one workpiece holding device including at least one workpiece holding element which includes a free end and an elastic peripheral wall which is radially expandable, and means adjustably mounting said one workpiece holding element for horizontal movement toward and away from said vertical axis and comprising a control shaft fixed to said one workpiece holding device and extending radially with respect to said vertical axis, and an engagement post fixed to said one workpiece holding element and slidably mounted to said control shaft, means fixed to said supporting upright for guidingly positioning said one workpiece holding element to a predetermined radial location when said workpiece holding device is at a predetermined circumferential location along said circular path of travel, and control means for selectively radially expanding and relaxing the elastic peripheral wall of said one workpiece holding element at predetermined locations of said one workpiece holding device during its movement about the circular path of travel.

2. The apparatus as defined in claim 1 wherein said one workpiece holding element is conically tapered toward said free end thereof.

3. The apparatus as defined in claim 1 wherein said means for guidingly positioning said one workpiece holding element comprises a threaded spindle mounted to said supporting upright for rotation about a radial axis which is parallel to said control shaft when said one workpiece holding device is in said predetermined circumferential location, a link threadedly mounted for movement on said spindle, with said link including a guide slot which is positioned so as to engage said engagement post and thereby move the same along said control shaft in either radial direction during said one workpiece holding device moving past said predetermined circumferential location, and means for selectively rotating said spindle so as to radially move said guide slot of said link to a selected position.

4. The apparatus as defined in claim 1 comprising a plurality of said workpiece holding devices, with each of said workpiece holding devices being mounted to said supporting upright in the manner of said one workpiece holding device, and with said workpiece holding devices being positioned in an equally spaced apart arrangement about said circular path of travel.

5. The apparatus as defined in claim 4 wherein each of said workpiece holding devices includes at least two of said workpiece holding elements, and further including means adjustably mounting each of said workpiece holding elements for horizontal movement toward and away from said vertical axis, and means fixed to said supporting upright for guidingly positioning each of said workpiece holding elements to a respective predetermined radial location when the associated workpiece holding device is at a predetermined circumferential location along said circular path of travel.

6. The apparatus as defined in claim 1 wherein said control means includes a source of pressurized fluid, a fluid line including a rotatable distributor leading from said fluid source to said one workpiece holding element, and valve means in said fluid line for controlling the flow of fluid therethrough.

7. The apparatus as defined in claim 6 wherein said valve means includes a stationary cam disk, and a follower mounted to said supporting upright so as to operatively engage said cam disk and for rotation with said one workpiece holding device about said vertical axis.

8. An apparatus for transporting workpieces between processing stations, and comprising a supporting upright,
at least one workpiece holding device,
means rotatably mounting said one workpiece holding device to said supporting upright for rotation about a vertical axis so as to define a circular path of travel, and for rotation about a horizontal axis, drive means for rotating said one workpiece holding device about said vertical axis and for selectively rotating said workpiece holding device about said horizontal axis at predetermined locations about the circular path of travel, said one workpiece holding device including at least one workpiece holding element, means adjustably mounting said one workpiece holding element for horizontal movement toward and away from said vertical axis, and comprising a control shaft fixed to said one workpiece holding device and extending radially with respect to said vertical axis, and an engagement post fixed to said one workpiece holding element and slidably mounted to said control shaft, and means fixed to said supporting upright for guidingly positioning said one workpiece holding element to a predetermined radial location when said workpiece holding device is at a predetermined location along said circular path of travel, and comprising a threaded spindle mounted to said supporting upright for rotation about a radial axis which is parallel to said control shaft when said one workpiece holding device is in said predetermined circumferential location, a link threadedly mounted for movement on said spindle, with said link including a guide slot which is positioned so as to engage said engagement post and thereby move the same along said control shaft in either radial direction during said one workpiece holding device moving past said predetermined circumferential location, and means for selectively rotating said spindle so as to radially move said guide slot of said link to a selected position.

9. The apparatus as defined in claim 8 comprising a plurality of said workpiece holding devices, with each of said workpiece holding devices being mounted to said supporting upright in the manner of said one workpiece holding device, and with said workpiece holding devices being positioned in an equally spaced apart arrangement about said circular path of travel.

* * * * *